United States Patent
Li et al.

(10) Patent No.: US 8,662,690 B2
(45) Date of Patent: Mar. 4, 2014

(54) MULTI-COLORED ILLUMINATION SYSTEM WITH WAVELENGTH CONVERTER AND METHOD

(75) Inventors: Yi Li, Pleasanton, CA (US); Quan Zhang, Wuhan (CN)

(73) Assignee: Appotronics Ltd., Shenzhen (CN)

( * ) Notice: Subject to any disclaimer, the term of this patent is extended or adjusted under 35 U.S.C. 154(b) by 206 days.

(21) Appl. No.: 13/386,657

(22) PCT Filed: Jul. 30, 2010

(86) PCT No.: PCT/CN2010/001160
§ 371 (c)(1),
(2), (4) Date: Jan. 23, 2012

(87) PCT Pub. No.: WO2011/011979
PCT Pub. Date: Feb. 3, 2011

(65) Prior Publication Data
US 2012/0147601 A1 Jun. 14, 2012

(30) Foreign Application Priority Data
Jul. 31, 2009 (CN) .......................... 2009 1 0109503

(51) Int. Cl.
*F21V 9/16* (2006.01)
(52) U.S. Cl.
USPC ........ 362/84; 362/232; 362/249.02; 362/277; 362/293; 362/231
(58) Field of Classification Search
USPC .............. 362/11, 231, 232, 236, 247, 249.02, 362/277, 282, 283, 293, 84
See application file for complete search history.

(56) References Cited

U.S. PATENT DOCUMENTS

| | | | | |
|---|---|---|---|---|
| 6,139,166 | A * | 10/2000 | Marshall et al. | 362/231 |
| 6,273,589 | B1 * | 8/2001 | Weber et al. | 362/293 |
| 6,755,554 | B2 * | 6/2004 | Ohmae et al. | 362/293 |
| 7,004,602 | B2 * | 2/2006 | Waters | 362/242 |
| 7,270,425 | B2 * | 9/2007 | Arai et al. | 353/87 |
| 7,270,427 | B2 * | 9/2007 | Sakata | 353/94 |
| 7,311,403 | B2 * | 12/2007 | Yoshii et al. | 353/31 |

(Continued)

FOREIGN PATENT DOCUMENTS

CN 1487356 4/2004
CN 101042225 9/2007

(Continued)

OTHER PUBLICATIONS

Chinese Office Action, dated Feb. 13, 2012, in a counterpart Chinese patent application No. CN 200910109503.1.

(Continued)

*Primary Examiner* — Ismael Negron
(74) *Attorney, Agent, or Firm* — Chen Yoshimura LLP

(57) ABSTRACT

An illumination system includes LED arrays (1, 2, 3) which are packaged on a heat dissipation plate and consist of several LED chips, an optical combining device (4) which can combine the light emitted by respective LED chips to one beam, a focusing lens (5) which can focus the light emitted by the optical combination device to a light-emitting window (11), a transmission type wavelength converter (7) and a control processing device. When white light is provided, the control processing device controls the LED chips with predetermined wavelengths to emit light and the transmission type wavelength converter is positioned into the light path to generate excited light.

27 Claims, 3 Drawing Sheets

(56) References Cited

U.S. PATENT DOCUMENTS

| | | | |
|---|---|---|---|
| 7,524,084 B2 * | 4/2009 | Ikeda et al. | 362/231 |
| 7,527,394 B2 * | 5/2009 | Tatsuno | 362/268 |
| 7,857,457 B2 * | 12/2010 | Rutherford et al. | 353/31 |
| 2004/0189956 A1 | 9/2004 | Kanayama et al. | |
| 2007/0121310 A1 | 5/2007 | Sakata et al. | |
| 2007/0253197 A1 | 11/2007 | Kung et al. | |
| 2009/0034284 A1 | 2/2009 | Li et al. | |
| 2009/0187234 A1 | 7/2009 | Meyer et al. | |

FOREIGN PATENT DOCUMENTS

| | | |
|---|---|---|
| CN | 201137834 | 10/2008 |
| CN | 101460778 | 6/2009 |
| WO | 2009017992 | 2/2009 |
| WO | 2009045922 | 4/2009 |

OTHER PUBLICATIONS

Chinese Office Action, dated Jul. 5, 2012, in a counterpart Chinese patent application No. CN 200910109503.1.

International Search Report in a counterpart PCT application No. PCT/CN2010/001160, dated Nov. 11, 2010.

Written Opinion in a counterpart PCT application No. PCT/CN2010/001160, dated Nov. 11, 2010.

* cited by examiner

MULTI-COLORED ILLUMINATION SYSTEM WITH WAVELENGTH CONVERTER AND METHOD

This is a National Stage application of PCT/CN2010/001160, filed Jul. 30, 2010, which claims priority from China application CN 200910109503.1, filed Jul. 31, 2009.

BACKGROUND OF THE INVENTION

1. Field of the Invention

This invention relates to illumination devices and systems, and in particular, it relates to illumination devices and systems useful in stage lighting.

2. Description of the Related Art

LED (light emitting diodes) light sources are clean and energy efficient light sources. The achievable luminous flux of LED light sources increases every year. Currently, LED light sources are mostly used in low power, low end color-changing lighting products.

Most high power stage lights currently use metal halide discharge lamps. Such lamps are white light sources, and have relatively short life, typically from a few hundred to a few thousand hours. As the emission spectrum of metal halide discharge lamps is a continuous white spectrum, color lights of various colors required by stage lighting are obtained by using color filters. Such color lights and the resulting projected patterns have relatively low color saturation, and their colors are neither very vivid nor very rich. To increase the saturation of monochromatic light obtained by such a system, color filters with very narrow transmission bands may be used, but this decreases the brightness of the monochromatic light.

Using LED light sources for stage lighting can achieve monochromatic lights without using filters. Further, by adjusting the drive current of LEDs of various base colors (e.g. primary colors), desired colors of the output monochromatic light can be achieved. By taking advantage of the relatively high saturation of monochromatic LED light sources, a great number of colors can be achieved for stage lighting, making the system more flexible. However, current LED light sources tend to generate a large amount of heat, and their light emitting efficiency is still relatively low. As single LED chips still cannot provide sufficiently high output power, high power stage lighting systems must rely on LED arrays to achieve the desired luminous flux.

Chinese patent application No. 200720061982.0 describes a light source system for stage lighting, which employs a LED array and a large heat dissipation device to provide a power of 100 W. This system can also achieve adjustable color by controlling the power of the LEDs of different colors within the system. However, due to concerns on heat dissipation and luminous flux, as well as uniformity of brightness and color of the output light, this system still cannot satisfy the need for high power stage lighting systems.

To overcome the problems of the above system, an improved system is described in a Chinese patent application filed by the applicant of this application. This system employs a wavelength-based light combining device to combine monochromatic lights from multiple LED arrays into one light beam. This system offers increased output power and improved uniformity of brightness and color of the output light.

Current stage lighting systems that employ LED array, such as those described above, have certain shortcomings, in particular: When such systems are used to generate a white light, the light generating efficiency is lower than the efficiency of traditional metal halide discharge lamps. One reason is that metal halide discharge lamps are hot light sources, so their light output efficiency is virtually unaffected by heat generation, i.e., regardless of the output power of the light source, their light generating efficiencies are substantially unchanged. For example, a currently available 575 W stage lamp outputs 49000 lumens of light, at an efficiency of about 85 lumens/W; a 1200 W stage lamp outputs 110000 lumens of light, again at an efficiency of about 85 lumens/W. By contrast, in high power LED light sources which combine monochromatic lights to generate white light, the following factors cause a decrease in white light generating efficiency at high power: On the one hand, green LED chips (i.e. LED chips that emit green light) currently have relatively low electrical to light conversion efficiency, blue LEDs have relatively high efficiency, and red LEDs have an efficiency in between; on the other hand, a white spectrum has the most green component, less red component, and the least blue component. This means that to adjust the white balance, when combining the three colored LED lights, the output power of the blue and red lights have to be lowered, resulting in a low overall efficiency.

SUMMARY OF THE INVENTION

Accordingly, the present invention is directed to a stage lighting system and related methods that substantially obviate one or more of the problems due to limitations and disadvantages of the related art. An object of the present invention is to increase the output efficiency of white light while increasing output power.

A principle of the present invention is that, to avoid the problem of low efficiency when generating a white light by combining red (R), green (G) and blue (B) LED lights, the required white light during the required time period for a stage lighting system can be provided by generating a white light using a single excitation light source and a wavelength conversion material such as phosphors. This will increase the brightness of the resulting white light.

To achieve these and other advantages and in accordance with the purpose of the present invention, as embodied and broadly described, the present invention provides a method for providing a high brightness white light in a stage lighting system, which includes: combining light from a plurality of LED (light emitting diode) chips on an LED array into one light beam, the LED array being packaged on a heat dissipating substrate; directing the combined light beam toward a light output port; controlling light emission of the plurality of LED chips of the LED array having various emission wavelengths, to generate an output light at the output port having a predetermined color or color variation; during a predetermined time period when a white light is to be outputted at the light output port, controlling some of the plurality of LED chips which emit at a first predetermined wavelength to emit light, and controlling a transmission type wavelength conversion device to move into an optical path of the combined light beam, the transmission type wavelength conversion device generating an excited light having a second predetermined wavelength which is combined with light having the first predetermined wavelength emitted by the LED chips to generate a white light; and after the predetermined time period passes, controlling the transmission type wavelength conversion device to move out of the optical path.

More specifically, the stage lighting system may include two LED arrays, each LED array including LED chips emitting at a same wavelength, wherein the method further includes providing two lens arrays each including a plurality of lenses, each lens in the lens arrays being aligned with one LED chip to collimate light emitted by the LED chip into near parallel light; wherein the combining step includes combining two near parallel light beams from the two lens arrays into one light beam using a dichroic filter which reflects and transmits light of different wavelengths; and wherein the directing step includes focusing the combined light by a focusing lens onto the light output port. The stage lighting system may also include three LED arrays, each LED array including LED chips emitting at a same wavelength, wherein the method further includes providing three lens arrays each including a plurality of lenses, each lens in the lens arrays being aligned with one LED chip to collimate light emitted by the LED chip into near parallel light; wherein the combining step includes combining three near parallel light beams from the three lens arrays into one light beam using a wavelength-based light combiner; and wherein the directing step includes focusing the combined light by a focusing lens onto the light output port. The wavelength-based light combiner may an X-shaped dichroic filter set having three light input ports, each light input port being aligned with one lens array. One of the LED arrays may include only LED chips emitting a blue light, wherein the transmission type wavelength conversion device includes a wavelength conversion material that generates a yellow excited light.

The transmission type wavelength conversion device may include a wavelength conversion material and a rotating wheel with a rotating shaft, the rotating wheel including a transparent portion for holding the wavelength conversion material, wherein the method further includes: when the transmission type wavelength conversion device is moved into the optical path, controlling the rotating wheel to rotate so that a ring shaped area of the rotating wheel is scanned through the optical path as the rotating wheel rotates. Alternatively, the transmission type wavelength conversion device may be disposed on a wheel having a rotating shaft, wherein the steps of controlling the transmission type wavelength conversion device to move into or out of the optical path include controlling a rotation angle of the wheel. Further, the wheel may include one or more patterns disposed thereon, wherein the method further includes: selectively moving either the transmission type wavelength conversion device or a pattern into the optical path by controlling a rotation angle of the wheel.

The method may further include providing a projection lens disposed after the light output port to project the light from the output port at a distance. The method may further include: when the transmission type wavelength conversion device is controlled to move into the optical path, simultaneously controlling two associated lenses to move into the optical path, the two associated lenses being disposed before and after the transmission type wavelength conversion device, respectively, in the optical path; and when the transmission type wavelength conversion device is controlled to move out of the optical path, simultaneously controlling the two associated lenses to move out of the optical path. The method may further include providing a pattern plate carrying one or more patterns adjacent the light output port, wherein one of the patterns is aligned with the light output port. The pattern plate may be controlled to select one pattern to be aligned with the light output port.

In another aspect, the present invention provides a stage lighting system, which includes: at least one LED (light emitting diode) array including a plurality of LED chips packaged on a heat dissipating substrate; a light combining device for combining light from the LED chips into one light beam; a focusing lens for focusing the combined light beam onto a light output port; a transmission type wavelength conversion device; and a control and processing device for controlling light emission of the plurality of LED chips and controlling the transmission type wavelength conversion device to be moved into and out of an optical path between the focusing lens and the light output port during different predetermined time periods.

The LED array may include a plurality of LED chips emitting at two or more different wavelengths, wherein the light combining device is a light collecting assembly having a cup-shaped reflector, wherein the LED array is disposed near a bottom of the cup-shaped reflector, and wherein an opening of the cup-shaped reflector faces the focusing lens. Or, the system may include two LED arrays, each LED array including LED chips emitting at a same wavelength, wherein the light combining device includes a dichroic filter and two lens arrays corresponding to the two LED arrays, each lens array including a plurality of lenses, each lens in the lens arrays being aligned with one LED chip to collimate light emitted by the LED chip into near parallel light, wherein two near parallel light beams from the two lens arrays illuminate two sides of the dichroic filter and are transmitted and reflected by the dichroic filter, respectively, toward the focusing lens. Or, the system may include three LED arrays, each LED array including LED chips emitting at a same wavelength, wherein the light combining device includes a wavelength-based light combiner having three light input ports and three lens arrays corresponding to the three LED arrays, each lens array including a plurality of lenses, each lens in the lens arrays being aligned with one LED chip to collimate light emitted by the LED chip into near parallel light, wherein three near parallel light beams from the three lens arrays are combined by the wavelength-based light combiner into one light beam illuminating on the focusing lens. The wavelength-based light combiner may be an X-shaped dichroic filter set or a cascade type dichroic filter set including two dichroic filters disposed in parallel. The dichroic filter may be a dichroic filter plate or a glass plate coated with a dichroic filter film.

The system may further include two associated lenses being disposed to move into and out of the optical path in synchrony with the transmission type wavelength conversion device, wherein the two associated lenses are disposed on two sides of the transmission type wavelength conversion device in the optical path, respectively. The two associated lenses may be convex lenses or Fresnel lenses.

The transmission type wavelength conversion device may include a wavelength conversion material and a transparent medium holding the wavelength conversion material. The transmission type wavelength conversion device may include a rotating wheel with a rotating shaft, the rotating wheel including the transparent medium for holding the wavelength conversion material, wherein when the transmission type wavelength conversion device is moved into the optical path, the rotating wheel is controlled to rotate so that a ring shaped area of the rotating wheel is scanned through the optical path as the rotating wheel rotates. The control and processing device controls a translation movement of the transmission type wavelength conversion device to move the transmission type wavelength conversion device into and out of the optical path. Or, the transmission type wavelength conversion device may be disposed on a wheel having a rotating shaft, and wherein the control and processing device controls a rotation angle of the wheel to move the transmission type wavelength conversion device into or out of the optical path. The wheel may further include one or more patterns disposed thereon in an area outside of an areas occupied by the transmission type wavelength conversion device.

The system may further include a pattern plate carrying one or more patterns disposed adjacent the light output port, wherein one of the patterns is aligned with the light output port. The system may additionally include a projection lens disposed after the light output port to project the light from the output port at a distance.

A stage lighting system according to various embodiments of the present invention can provide rich colors, is easy to construct, and has high light utilization efficiency.

DETAILED DESCRIPTION OF THE PREFERRED EMBODIMENTS

Embodiments of the present invention are described below with references to the drawings.

According to conventional technology, a method for providing lights of various colors in a stage lighting system includes:

Combining light from multiple LED chips on an LED array into one light beam, the LED array being packaged on a heat dissipating substrate;

Directing the combined light beam toward a light output port;

Controlling the light emission of the various LED chips having various emission wavelengths within the LED array, such that the light outputted to the output port has a predetermined desired color or color variation.

An embodiment of the present invention adopts the above method steps, and includes the following additional steps:

During a predetermined time period when the output light at the output port is required to be white light, controlling some of the LED chips which emit at a first predetermined wavelength to emit light, and controlling a transmission type wavelength conversion device to move into the optical path of the combined light beam, the wavelength conversion device generating an excited light having a second predetermined wavelength which is combined with the LED light of the first predetermined wavelength to generate a white light; after the predetermined time period passes, controlling the transmission type wavelength conversion device to move out of the optical path.

Figure 1:
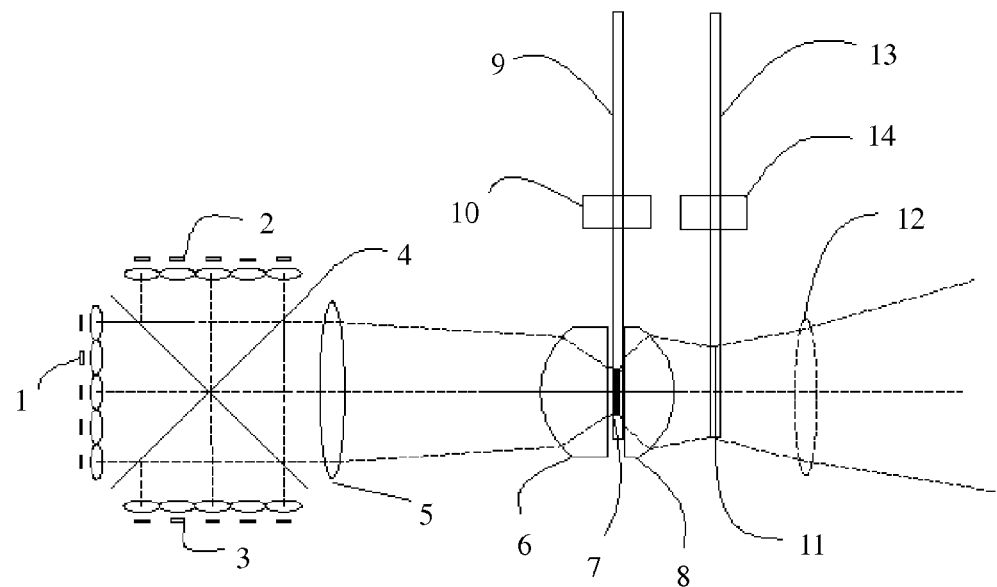
FIG. 1 schematically illustrates a stage lighting system according to an embodiment of the present invention, in the state when a white light is being generated.

As shown in FIG. 1, a stage lighting system according to an embodiment of the present invention includes at least one LED array formed by multiple LED chips packaged on a heat dissipating substrate at desired special distances from each other; a light combining device 4 for combining the light from the multiple LED chips into a light beam; and a focusing lens 5 for focusing the light beam on the light output port 11. The at least one LED array may include one or more LED arrays each having same colored LED chips. In the example shown in FIG. 1, three LED arrays 1, 2 and 3 are provided, containing R, G and B LED chips, respectively, although the invention is not limited to this configuration. Correspondingly, the light combining device 4 includes a wavelength-based light combiner having three light input ports, and three lens arrays each containing multiple lenses, the three lens arrays corresponding to the three LED arrays. Each lens in the lens arrays is aligned with one LED chip to maximize the collection of the wide-angle light from the LED chip, and convert the divergent light form the LED chip into near parallel light with a relatively small divergent angle (the smaller the better). The three near-parallel R, G, B light beams from the three lens arrays are combined by the wavelength-based light combiner into one beam toward the focusing lens 5. The wavelength-based light combiner may be an X-shaped dichroic filter set having three light input ports, each light input port being aligned with one lens array. Alternatively, the wavelength-based light combiner may be a cascade type dichroic filter set containing two dichroic filters disposed in parallel. The dichroic filters may be dichroic filter plates, or glass plates coated with dichroic filter films. These devices are well known and are not described in detail here.

In some cases, when the requirement for color variety in a stage lighting system is not very high, two monochromatic LED arrays will suffice. Correspondingly, the light combining device 4 may include one dichroic filter and two lens arrays. The two near-parallel light beams from the two lens array illuminate the two sides of the filter and are respectively transmitted and reflected by the filter toward the focusing lens 5. In some cases, when the requirements for brightness and color uniformity in a stage lighting system are not very high, one LED array containing LED chips of two or more colors may be used, and the light combining device 4 may be replaced by a light collecting assembly having a cup-shaped reflector. In this case, the LED array may be disposed near the bottom of the cup-shaped reflector, where the opening of the cup-shapes reflector faces the focusing lens 5. The specifics of these alternative systems are not described in detail here as they will be readily understood by those skilled in the art.

Figure 2:
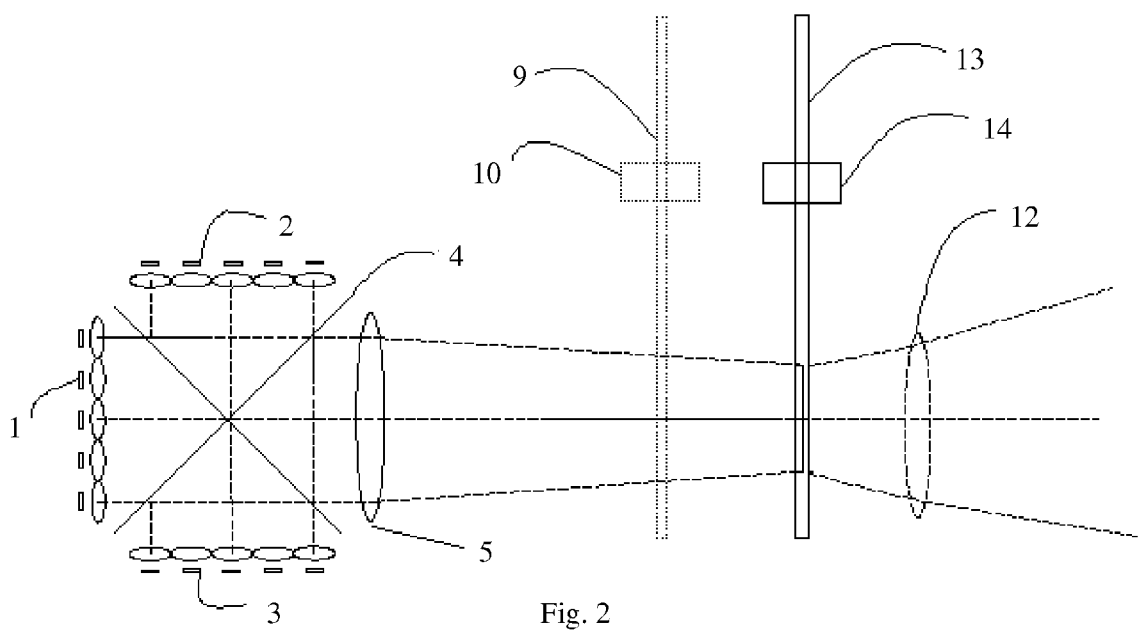
FIG. 2 schematically illustrates the stage lighting system in the state when a non-white light is being generated.

The stage lighting system according to embodiments of the present invention additionally includes a transmission type wavelength conversion device 7 and a control and processing device. The control and processing device controls the light emission of the multiple LED chips, and controls the transmission type wavelength conversion device 7 to move in and out of the optical path between the focusing lens 5 and the output port 11. FIG. 1 illustrates a state where the transmission type wavelength conversion device 7 is moved into the optical path, for generating a high brightness white light. FIG. 2 illustrates a state where the transmission type wavelength conversion device 7 is moved out of the optical path.

Figure 3:
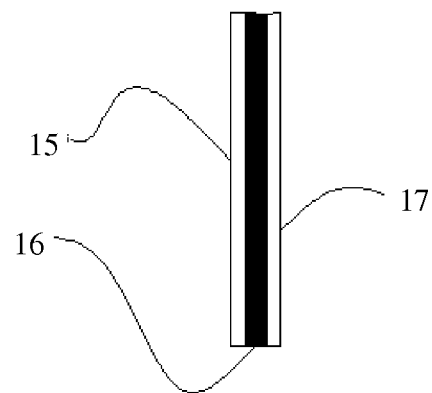
FIG. 3 illustrates the wavelength conversion device of the stage lighting system shown in FIG. 1.

The transmission type wavelength conversion device 7 includes a wavelength conversion material and transparent media that hold (e.g. carry or sandwich) the wavelength conversion material. As shown in FIG. 3, two pieces of transparent media 15 and 17 sandwiches the wavelength conversion material 16, which may be, for example without limitation, phosphors, dyes, quantum emitting materials, etc. Alternatively, the wavelength conversion material may be mixed with an adhesive and coated on a transparent medium.

As shown in FIG. 1, the transmission type wavelength conversion device 7 is disposed on a transparent wheel or plate 9 which has a rotating shaft 10. The control and processing device controls the rotation angle of the transparent wheel or plate 9 to cause the transmission type wavelength conversion device 7 to move into or out of the optical path. In the case where the wavelength conversion material is a phosphor material, small-angle incident light onto the wavelength conversion material becomes a Lambert distribution with near 180 degree output angle range after the wavelength conversion material. This increases the etendue of the system and adversely affects the collection of light by the output port 11. According to an embodiment of the present invention, two associated lenses 6 and 8 are disposed adjacent the transmission type wavelength conversion device 7 and move in synchrony with the wavelength conversion device into and out of the optical path. The associated lenses 6 and 8 may be convex lenses or Fresnel lenses. The lenses are disposes on two sides of the transmission type wavelength conversion device 7 in the optical path, respectively. The first lens 6 has a relatively high focusing power and focuses the light onto the transmission type wavelength conversion device 7; the second lens 8 collects the light from the wavelength conversion device, including large-angle lights, such that the effective aperture size of the output light is approximately the same as the size of the output port 11, to reduce light loss.

In one example of the system shown in FIG. 1, one of the LED array contains all blue LED chips, and the transmission type wavelength conversion device 7 correspondingly includes a wavelength conversion material that generates a yellow excited light when excite by a blue light. When white light is desired from the stage lighting system, the control and processing devices controls the blue LED chips to emit light, controls the LED chips of the other two LED arrays to turn off, and controls the transmission type wavelength conversion device 7 and the associated lenses 6 and 8 to move into the optical path. The wavelength conversion material is excited and emits a yellow light; the yellow light is combined with a portion of the blue light that is transmitted through the wavelength conversion material to form a white light. The brightness of such a white light is far greater than a white light generated by combining lights from the R, G, B LED chips. The thickness of the wavelength conversion material affects the color temperature of the generated white light. Thus, the color temperature of the white light may be changed by adjusting the thickness of the wavelength conversion material.

The associated lenses 6 and 8 are desired to move in synchrony with the transmission type wavelength conversion device 7; for example, they may rotate together with the transmission type wavelength conversion device around the shaft 10. As shown in FIG. 2, the lenses 6 and 8 are moved out of the optical path together with the transmission type wavelength conversion device 7. In such a state, the high power LED lights of the R, G, B primary colors can be combined to generate light of various desired colors. The system of this embodiment, which allows moving the transmission type wavelength conversion device into and out of the optical path, can alleviate the problem of conventional stage lighting system of insufficient brightness of the white light, and maintain the benefit of providing lights with high color saturation and a richness of colors.

In one embodiment, to protect the wavelength conversion material from the high power of the incident light on the transmission type wavelength conversion device 7, the transmission type wavelength conversion device 7 may employ a transparent wheel to hold the wavelength conversion material. When the wavelength conversion material is moved into the optical path, the wheel is controlled to rotate so that a ring shaped area of the wheel which carries the wavelength conversion material is scanned through in the optical path as the wheel rotates. This avoids heat accumulation on a small area of the wavelength conversion material. To move the wavelength conversion material into and out of the optical path, a moving mechanism is provided to move the wheel, e.g., in an up and down translation motion. The associated lenses 6 and 8 may be moved by the moving mechanism in synchrony with the transmission type wavelength conversion device 7, but do not rotate with it.

Figure 6:
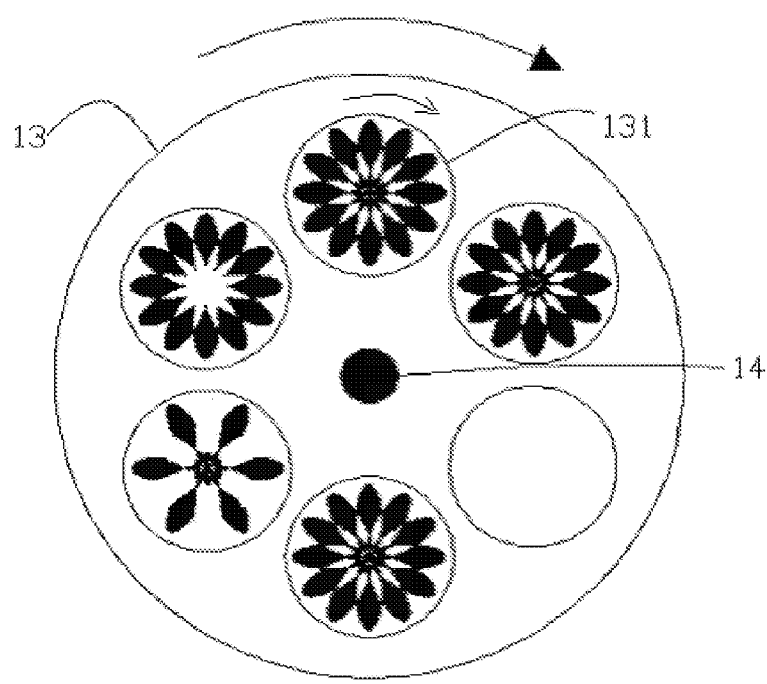
FIG. 6 illustrates a pattern plate useful in the stage lighting system according to embodiments of the present invention.

To provide a pattern projection function for the stage lighting system, the system may include a pattern plate carrying one or more patterns. As shown in FIG. 2, when the transmission type wavelength conversion device 7 is moved out of the optical path (the dotted lines in this figure schematically shows the components that remain in the optical path when the wavelength conversion material is moved out), the pattern plate may be disposed at the output port 11. As shown in FIG. 6, the pattern plate may include a rotation plate 13 with a rotating shaft 14, carrying multiple patterns. The control and processing device controls the rotation angle of the rotation plate 13 to select or switch the desired patterns, such that one pattern (e.g. pattern 131) is aligned with the output port 11.

In this embodiment, each pattern itself (e.g. pattern 131) may be provided on a smaller rotating plate to rotate about itself to provide a dynamic effect for the output light pattern.

Figure 5:
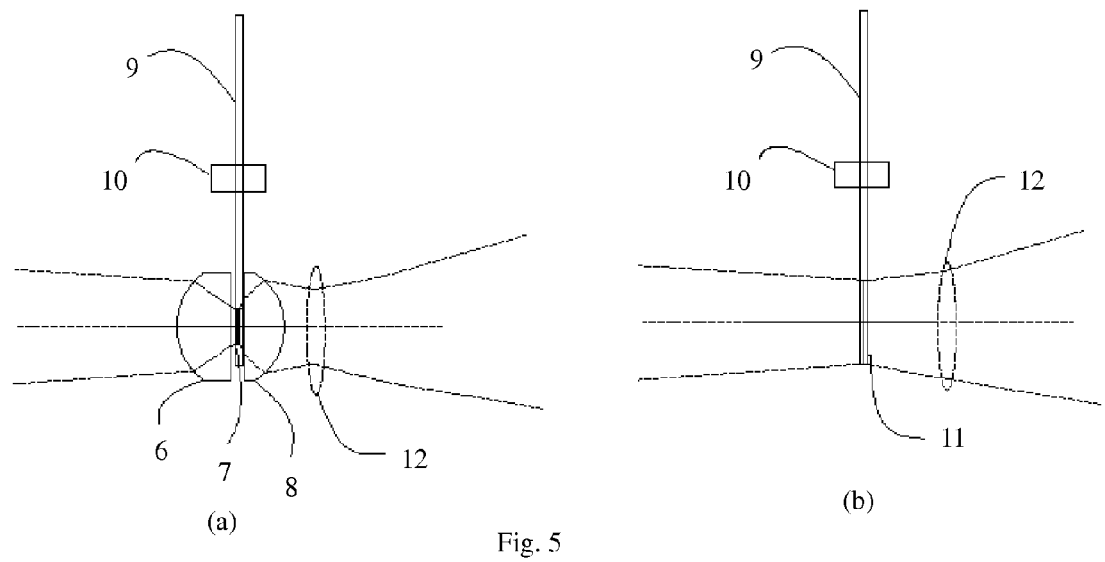
FIGS. 5(a) and 5(b) schematically illustrates a stage lighting system according to an alternative embodiment of the present invention.

If no pattern will be required when the white light is generated, then the transparent wheel or plate 9 shown in FIG. 1 may be provided with one or more patterns in areas outside of the area occupied by the transmission type wavelength conversion device 7. Thus, by controlling the rotation angle of the transparent wheel or plate 9, either one of the patterns or the transmission type wavelength conversion device 7 may be selected to be disposed in the optical path, as shown in FIGS. 5(a) and 5(b). In FIG. 5(a), due to the need to control the aperture of the imaging system, a higher requirement is placed on the quality of the second associated lens 8.

The system according to embodiments of the present invention may also include a projection lens 12 disposed after the output port 11, to project the output light from the output port at a distance.

Figure 4:
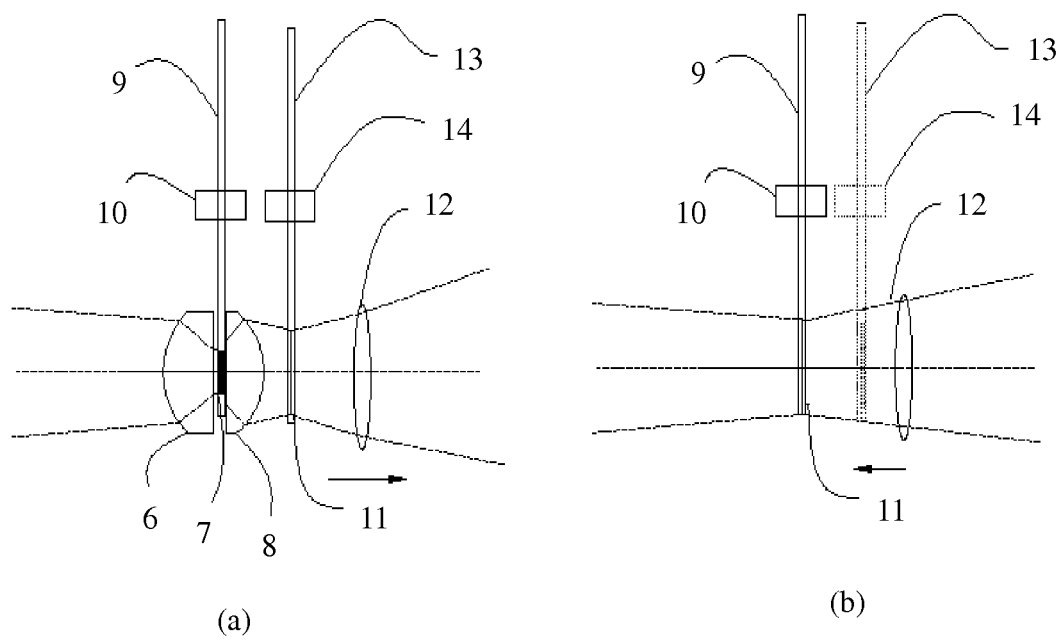
FIGS. 4(a) and 4(b) illustrate the operation of the projection lens of the stage lighting system shown in FIG. 1.

The pattern plate mentioned above may have an area without any pattern, for use when white light is generated or in other desired situations. Sometimes, the system may require a pattern when a white light is generated. In such a case, as shown in the partial view of FIGS. 4(a) and 4(b), the transmission type wavelength conversion device 7 is disposed on the rotating plate 9, and the patterns are disposed on the pattern plate 13. As shown in FIG. 4(a), when the transmission type wavelength conversion device 7 is moved into the optical path, to obtain a clearly formed image, the projection lens 12 as a whole should be moved farther away from the light source. Conversely, as shown in FIG. 4(b), when the transmission type wavelength conversion device 7 is moved out of the optical path, because the patterns typically have a larger diameter, to obtain a clearly formed image, the projection lens 12 as a whole should be moved closer to the light source.

It will be apparent to those skilled in the art that various modification and variations can be made in the stage lighting system and related method of the present invention without departing from the spirit or scope of the invention. Thus, it is intended that the present invention cover modifications and variations that come within the scope of the appended claims and their equivalents.

What is claimed is:
1. A stage lighting system, comprising:
    at least one LED (light emitting diode) array including a plurality of LED chips packaged on a heat dissipating substrate;

a light combining device for combining light from the LED chips into one light beam;

a focusing lens for focusing the combined light beam onto a light output port;

a transmission type wavelength conversion device; and a control and processing device for controlling light emission of the plurality of LED chips and controlling the transmission type wavelength conversion device to be moved into and out of an optical path between the focusing lens and the light output port during different predetermined time periods.

2. The system of claim 1, wherein the LED array includes a plurality of LED chips emitting at two or more different wavelengths, wherein the light combining device is a light collecting assembly having a cup-shaped reflector, wherein the LED array is disposed near a bottom of the cup-shaped reflector, and wherein an opening of the cup-shaped reflector faces the focusing lens.

3. The system of claim 1, further including a pattern plate carrying one or more patterns disposed adjacent the light output port, wherein one of the patterns is aligned with the light output port.

4. The system of claim 1, further comprising a projection lens disposed after the light output port to project the light from the output port at a distance.

5. The system of claim 1, comprising two LED arrays, each LED array including LED chips emitting at a same wavelength, wherein the light combining device includes a dichroic filter and two lens arrays corresponding to the two LED arrays, each lens array including a plurality of lenses, each lens in the lens arrays being aligned with one LED chip to collimate light emitted by the LED chip into near parallel light, wherein two near parallel light beams from the two lens arrays illuminate two sides of the dichroic filter and are transmitted and reflected by the dichroic filter, respectively, toward the focusing lens.

6. The system of claim 5, wherein the dichroic filter is a dichroic filter plate or a glass plate coated with a dichroic filter film.

7. The system of claim 1, comprising three LED arrays, each LED array including LED chips emitting at a same wavelength, wherein the light combining device includes a wavelength-based light combiner having three light input ports and three lens arrays corresponding to the three LED arrays, each lens array including a plurality of lenses, each lens in the lens arrays being aligned with one LED chip to collimate light emitted by the LED chip into near parallel light, wherein three near parallel light beams from the three lens arrays are combined by the wavelength-based light combiner into one light beam illuminating on the focusing lens.

8. The system of claim 7, wherein the wavelength-based light combiner is an X-shaped dichroic filter set or a cascade type dichroic filter set including two dichroic filters disposed in parallel.

9. The system of claim 1, further comprising:

two associated lenses being disposed to move into and out of the optical path in synchrony with the transmission type wavelength conversion device, wherein the two associated lenses are disposed on two sides of the transmission type wavelength conversion device in the optical path, respectively.

10. The system of claim 9, wherein the two associated lenses are convex lenses or Fresnel lenses.

11. The system of claim 1, wherein the transmission type wavelength conversion device is disposed on a wheel having a rotating shaft, and wherein the control and processing device controls a rotation angle of the wheel to move the transmission type wavelength conversion device into or out of the optical path.

12. The system of claim 11, wherein the wheel further includes one or more patterns disposed thereon in an area outside of an areas occupied by the transmission type wavelength conversion device.

13. The system of claim 1, wherein the transmission type wavelength conversion device includes a wavelength conversion material and a transparent medium holding the wavelength conversion material.

14. The system of claim 13, wherein the transmission type wavelength conversion device includes a rotating wheel with a rotating shaft, the rotating wheel including the transparent medium for holding the wavelength conversion material, wherein when the transmission type wavelength conversion device is moved into the optical path, the rotating wheel is controlled to rotate so that a ring shaped area of the rotating wheel is scanned through the optical path as the rotating wheel rotates.

15. The system of claim 13, wherein the control and processing device controls a translation movement of the transmission type wavelength conversion device to move the transmission type wavelength conversion device into and out of the optical path.

16. A method for providing a high brightness white light in a stage lighting system, comprising:

combining light from a plurality of LED (light emitting diode) chips on an LED array into one light beam, the LED array being packaged on a heat dissipating substrate;

directing the combined light beam toward a light output port;

controlling light emission of the plurality of LED chips of the LED array having various emission wavelengths, to generate an output light at the output port having a predetermined color or color variation;

during a predetermined time period when a white light is to be outputted at the light output port, controlling some of the plurality of LED chips which emit at a first predetermined wavelength to emit light, and controlling a transmission type wavelength conversion device to move into an optical path of the combined light beam, the transmission type wavelength conversion device generating an excited light having a second predetermined wavelength which is combined with light having the first predetermined wavelength emitted by the LED chips to generate a white light; and after the predetermined time period passes, controlling the transmission type wavelength conversion device to move out of the optical path.

17. The method of claim 16, wherein the transmission type wavelength conversion device includes a wavelength conversion material and a rotating wheel with a rotating shaft, the rotating wheel including a transparent portion for holding the wavelength conversion material, wherein the method further comprises: when the transmission type wavelength conversion device is moved into the optical path, controlling the rotating wheel to rotate so that a ring shaped area of the rotating wheel is scanned through the optical path as the rotating wheel rotates.

18. The method of claim 16, further comprising:
when the transmission type wavelength conversion device is controlled to move into the optical path, simultaneously controlling two associated lenses to move into the optical path, the two associated lenses being disposed before and after the transmission type wavelength conversion device, respectively, in the optical path; and
when the transmission type wavelength conversion device is controlled to move out of the optical path, simultaneously controlling the two associated lenses to move out of the optical path.

19. The method of claim 16, further comprising:
providing a projection lens disposed after the light output port to project the light from the output port at a distance.

20. The method of claim 16,
wherein the stage lighting system includes two LED arrays, each LED array including LED chips emitting at a same wavelength,
wherein the method further comprises providing two lens arrays each including a plurality of lenses, each lens in the lens arrays being aligned with one LED chip to collimate light emitted by the LED chip into near parallel light;
wherein the combining step includes combining two near parallel light beams from the two lens arrays into one light beam using a dichroic filter which reflects and transmits light of different wavelengths; and
wherein the directing step includes focusing the combined light by a focusing lens onto the light output port.

21. The method of claim 20, wherein one of the LED arrays includes only LED chips emitting a blue light, and wherein the transmission type wavelength conversion device includes a wavelength conversion material that generates a yellow excited light.

22. The method of claim 16,
wherein the stage lighting system includes three LED arrays, each LED array including LED chips emitting at a same wavelength,
wherein the method further comprises providing three lens arrays each including a plurality of lenses, each lens in the lens arrays being aligned with one LED chip to collimate light emitted by the LED chip into near parallel light;
wherein the combining step includes combining three near parallel light beams from the three lens arrays into one light beam using a wavelength-based light combiner; and
wherein the directing step includes focusing the combined light by a focusing lens onto the light output port.

23. The method of claim 22, wherein the wavelength-based light combiner is an X-shaped dichroic filter set having three light input ports, each light input port being aligned with one lens array.

24. The method of claim 16, wherein the transmission type wavelength conversion device is disposed on a wheel having a rotating shaft,
wherein the steps of controlling the transmission type wavelength conversion device to move into or out of the optical path include controlling a rotation angle of the wheel.

25. The method of claim 24, wherein the wheel further includes one or more patterns disposed thereon,
wherein the method further comprises selectively moving either the transmission type wavelength conversion device or a pattern into the optical path by controlling a rotation angle of the wheel.

26. The method of claim 24, further comprising providing a pattern plate carrying one or more patterns adjacent the light output port, wherein one of the patterns is aligned with the light output port.

27. The method of claim 26, wherein when the pattern plate includes more than one pattern, the method further comprises controlling the pattern plate to select one pattern to be aligned with the light output port.

* * * * *